United States Patent
Cooper et al.

(10) Patent No.: US 6,181,710 B1
(45) Date of Patent: Jan. 30, 2001

(54) HANDLING OF TELECOMMUNICATIONS SIGNALS PASSED BETWEEN ELEMENTS OF A TELECOMMUNICATIONS NETWORK

(75) Inventors: Ian L. Cooper, Basingstoke; Jonathan A. Thompson, Newbury; Martin Lysejko, Bagshot; Joemanne Chi Cheung Yeung, Wootton; Andrew M. Walding, Sunninghill; Guy A. Cooper, Windsor, all of (GB)

(73) Assignee: Alcatel USA Sourcing, L.P., Plano, TX (US)

( * ) Notice: Under 35 U.S.C. 154(b), the term of this patent shall be extended for 0 days.

(21) Appl. No.: 09/001,023

(22) Filed: Dec. 30, 1997

(30) Foreign Application Priority Data

Jun. 11, 1997 (GB) .................................................. 9712172

(51) Int. Cl.$^7$ ................................ H04J 3/22; H04L 12/56

(52) U.S. Cl. ........................... 370/467; 370/395; 370/401

(58) Field of Search ..................................... 370/328, 522, 370/466, 467, 464, 465, 401, 395; 455/436, 555; 709/250; 379/230

(56) References Cited

U.S. PATENT DOCUMENTS

| 5,754,555 | * | 5/1998 | Hurme et al. ........................ 370/522 |
| 5,920,562 | * | 7/1999 | Christie et al. ...................... 370/395 |

(List continued on next page.)

FOREIGN PATENT DOCUMENTS

| 0589619 | 3/1994 | (EP) | ................................ H04Q/7/04 |
| 0760587 | 3/1997 | (EP) | ................................ H04Q/7/24 |
| 0822731 | 2/1998 | (EP) | ................................ H04Q/11/04 |
| 2301755 | 12/1996 | (GB) | ............................. H04L/29/06 |
| 2301756 | 12/1996 | (GB) | ............................. H04L/29/06 |

OTHER PUBLICATIONS

Ashok Jhunjhunwala, et al., "Wireless in Local Loop: Some Key Issues", IETE Technical Review, vol. 12, No. 5–6, Sep.–Dec. 1995, pp. 309–314.

Karim Khakzar, "V5 Interfaces Between Digital Local Exchanges and Access Networks", Frequenz, vol. 48, No. 1/2, Jan./Feb. 1994, pp. 44–50.

PCT Search Report, dated Jan. 22, 1999.

*Primary Examiner*—Hassan Kizou
*Assistant Examiner*—John Pezzlo
(74) *Attorney, Agent, or Firm*—Baker Botts L.L.P.

(57) ABSTRACT

The present invention provides a system for handling telecommunications signals passed between a first and second element of a telecommunications network, the first element having an interface for transmitting and receiving signals in a first protocol, and the second element having an interface for transmitting and receiving signals in a second protocol. The system of the present invention comprises a first interface unit for receiving a first telecommunications signal transmitted in one of said first and second protocols between said first and second elements, the first interface unit being arranged to separate traffic bearing channels from non-traffic bearing channels within the first telecommunications signal. A traffic management element is then provided for performing a cross-connection function to map the traffic bearing channels to the appropriate format for the other of said protocols, whilst a protocol conversion element is provided for performing predetermined protocol conversion steps on the non-traffic bearing channels in order to regenerate those non-traffic bearing channels in the other of said protocols. Further, a second interface unit is provided for combining the channels as output by the traffic management element and the protocol conversion element in order to create a second telecommunications signal in the other of said protocols, the second interface unit being arranged to output the second telecommunications signal. Preferably, said first protocol has a concentrated format, and said second protocol has an unconcentrated format.

24 Claims, 13 Drawing Sheets

U.S. PATENT DOCUMENTS

| | | | |
|---|---|---|---|
| 5,936,949 | * | 8/1999 | Pasternak et al. .................. 370/328 |
| 5,954,799 | * | 9/1999 | Goheen et al. ..................... 709/250 |
| 5,956,652 | * | 9/1999 | Eriksson .............................. 455/555 |
| 6,002,689 | * | 12/1999 | Christie et al. ..................... 370/401 |
| 6,009,326 | * | 12/1999 | Roder et al. ........................ 455/436 |
| 6,081,591 | * | 6/2000 | Skoog ................................. 379/230 |

* cited by examiner

HANDLING OF TELECOMMUNICATIONS SIGNALS PASSED BETWEEN ELEMENTS OF A TELECOMMUNICATIONS NETWORK

TECHNICAL FIELD OF THE INVENTION

The present invention relates to the handling of telecommunications signals passed between elements of a telecommunications network, and in particular concerns the handling of such signals when passed between a first element arranged to use a first protocol and a second element arranged to use a second protocol.

BACKGROUND OF THE INVENTION

As the number of users of telecommunications networks increases, so there is an ever increasing demand for the elements of those telecommunications networks to be able to handle more traffic. This has led to the development of concentration and signalling techniques such as those defined in protocols such as TR303 or V5.2.

One area in which it is contemplated to use such concentrated interfaces is that of wireless telecommunications systems, where, as the number of subscribers to the wireless telecommunications system increases, so there is an increasing demand for the air interface resources to handle more user traffic.

One particular wireless telecommunications system which has been proposed involves dividing a geographical area into cells, each cell having one or more central terminals (CTs) for communicating over wireless links with a number of subscriber terminals (STs) in the cell. These wireless links are typically established over predetermined frequency channels, a frequency channel typically consisting of one frequency for uplink signals from a subscriber terminal to the central terminal, and another frequency for downlink signals from the central terminal to the subscriber terminal.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

The central terminal is typically connected to a telephone network and exists to relay messages from subscriber terminals in the cell controlled by the central terminal to the telephone network, and vice versa. By this approach, an item of telecommunications equipment connected to a subscriber terminal may make an outgoing call to the telephone network, and may receive incoming calls from the telephone network.

Due to bandwidth constraints, it is not practical for each individual subscriber terminal to have its own dedicated frequency channel for communicating with a central terminal. Hence, techniques have been developed to enable a number of different ST-CT communications to be handled simultaneously on the same frequency channel without interfering with each other. One such technique involves the use of a "Code Division Multiple Access" (CDMA) technique whereby a set of orthogonal codes may be applied to the data to be transmitted on a particular frequency channel, data relating to different ST-CT communications being combined with different orthogonal codes from the set. Signals to which an orthogonal code has been applied can be considered as being transmitted over a corresponding orthogonal channel within a particular frequency channel.

One way of operating such a wireless telecommunications system is in a fixed assignment mode, where a particular ST is directly associated with a particular orthogonal channel of a particular frequency channel. Calls to and from items of telecommunications equipment connected to that ST will always be handled via that orthogonal channel on that particular frequency channel. That orthogonal channel is always available/dedicated to that particular ST.

However, to increase the number of users that may be supported by a single central terminal, an alternative way of operating such a wireless telecommunications system is in a Demand Assignment mode, in which a larger number of STs are associated with the central terminal than the number of traffic bearing orthogonal channels available. These orthogonal channels are then assigned to particular STs on demand as needed. This approach means that far more STs can be supported by a single central terminal than is possible in a fixed assignment mode, the exact number supported depending on the level of dial tone service that the service provider desires.

However, the use of a demand assignment mode complicates the interface between the central terminal and the switch of a public switched telephone network (PSTN). On the switch side interface, the CT must provide services to the switch as though all of the subscribers are connected with direct service even though they may not be actually acquired to a radio frequency channel. Regardless of whether the ST is acquired or not to the switch, all the subscribers must have a presence at the interface to the switch. In a typical fixed assignment mode of operation, it has been known to support 60 subscriber terminals (with two lines each) from a single CT, the CT having 4×2 Mbit (4×30 channels) digital interfaces to the switch. There is a fixed relationship between end user service and the channel of a 2 Mbit interface to the switch in such an embodiment. Given that, through the use of demand assignment, the number of subscribers could run into the hundreds or thousands, then, without some form of concentration, it is clear that a large number of interfaces to the switch would need to be provided. However, most PSTN switches still use unconcentrated interfaces such as V5.1 or CAS, and only relatively few use concentrated interfaces such as TR303 or V5.2.

Hence, it would be desirable to be able to operate such a wireless telecommunications system in a demand assignment mode of operation in order to increase the number of users that can be supported, but without having to provide the large number of interfaces to the switch that most switches with unconcentrated interfaces will require.

SUMMARY OF THE INVENTION

Viewed from a first aspect, the present invention provides a system for handling telecommunications signals passed between a first and second element of a telecommunications network, the first element having an interface for transmitting and receiving signals in a first protocol, and the second element having an interface for transmitting and receiving signals in a second protocol, the system comprising: a first interface unit for receiving a first telecommunications signal transmitted in one of said first and second protocols between said first and second elements, the first interface unit being arranged to separate traffic bearing channels from non-traffic bearing channels within the first telecommunications signal; a traffic management element for performing a cross-connection function to map the traffic bearing channels to the appropriate format for the other of said protocols; a protocol conversion element for performing predetermined protocol conversion steps on the non-traffic bearing channels in order to regenerate those non-traffic bearing channels in the other of said protocols; and a second interface unit for combining the channels as output by the traffic management element and the protocol conversion element in order to create a second telecommunications signal in the other of said protocols, the second interface unit being arranged to output the second telecommunications signal.

The present invention provides a technique for converting signals between interfaces employing different protocols, so that an element of a telecommunications network using a first protocol may communicate with an element of the telecommunications network using a second protocol, the conversion between the two protocols being transparent to these elements of the telecommunications network. In accordance with the invention, the traffic bearing channels are extracted from the non-traffic bearing channels, separate processing steps are performed on the traffic bearing channels and non-traffic bearing channels, respectively, and then the two processed signals are combined prior to being output to the destination element of the telecommunications network.

Preferably, the traffic management element is arranged to perform the cross-connection function at the 64 Kbit level. By this approach, the 64 Kbit traffic channels can be "wrapped" in any protocol standard or multiplexing level, and so the flexibility of the system to have any interface type is inherent.

Preferably, the first protocol has a concentrated format, and the second protocol has an unconcentrated format. In one embodiment, the first protocol is V5.2, and the second protocol is V5.1. However, in an alternative embodiment, the first protocol is V5.2, and the second protocol is CAS. In this alternative embodiment, the second element may have a voice frequency (VF) interface, in which case the system preferably further comprises a channel bank application for receiving the CAS signals output by the second interface unit and for converting said CAS signals in to VF signals for outputting from one or more VF interfaces to the second element.

In another embodiment, the first protocol is V5.2, and the second protocol is TR08. Alternatively, the first protocol may be V5.2, and the second protocol may be another concentrated protocol such as TR303. Indeed, it will be appreciated by those skilled in the art that the present invention can be applied to convert between many different protocols used by telecommunications equipment.

In preferred embodiments, the traffic management element may be arranged to perform any conversion steps required to map the traffic bearing channels between the formats of the first and second protocols.

Preferably, a multiplexer/demultiplexer element is also provided for multiplexing traffic bearing channels output by the traffic management element for transmission to the first element, and for demultiplexing traffic bearing channels received in signals from the first element prior to those traffic bearing channels being processed by the traffic management element.

In preferred embodiments, compression and decompression techniques may be applied to the data passed on the traffic bearing channels in order to increase the number of users that may be supported by the telecommunications network. In such cases, the system in accordance with preferred embodiments further comprises a compression/decompression engine for performing any compression and/or decompression functions required to convert the first telecommunications signal in to the second telecommunications signal. Preferably, the compression/decompression engine is located between the traffic management element and the multiplexer/demultiplexer element.

Typically, a telecommunications system can be managed by connecting a management system to specific elements of the telecommunications system that need to be managed. In accordance with preferred embodiments of the present invention, the system further comprises a management interface for connecting the telecommunications system with a management system, the management system being arranged to send data to the management interface for insertion in to the signals sent in the first protocol to the first element. The various management issues arising from the concentration of wireless interfaces, the compression of signals, and the large number of users, can then be managed centrally via the system of preferred embodiments.

In one preferred embodiment, said first element is a central terminal of a wireless telecommunications system, and said second element is a switch of the telecommunications network. In such an embodiment, the system is preferably located at a central office containing the switch, and is arranged to communicate with the central terminal via a backhaul facility using the first protocol.

In an alternative embodiment, said first element is a central terminal of a wireless telecommunications system, and said second element is a fiber bank assembly. Optical technology can in this way be interfaced with the wireless telecommunications system.

In yet another alternative embodiment, a cross-connect element for a central switching office of a telecommunications system can be arranged to have a system in accordance with the present invention connected thereto in order to provide an extension to the cross-connect element. This allows for grooming and protocol translation between unlike elements connected to the cross-connect.

Viewed from a second aspect, the present invention provides a method of handling telecommunications signals passed between a first and second element of a telecommunications network, the first element having an interface for transmitting and receiving signals in a first protocol, and the second element having an interface for transmitting and receiving signals in a second protocol, the method comprising the steps of:

(a) receiving a first telecommunications signal transmitted in one of said first and second protocols between said first and second elements;

(b) extracting traffic bearing channels from the signal and performing a cross-connection function to map those traffic bearing channels to the appropriate format for the other of said protocols;

(c) extracting non-traffic bearing channels from the signal and performing predetermined protocol conversion steps on those non-traffic bearing channels in order to regenerate those non-traffic bearing channels in the other of said protocols;

(d) combining the channels as output from said steps (b) and (c) to create a second telecommunications signal in the other of said protocols; and (e) outputting the signal generated at said step (d).

By this approach, the present invention provides a technique for converting signals between interfaces employing different protocols so that an element of a telecommunications network using a first protocol may communicate with an element of the telecommunications network using a second protocol, the conversion between the two protocols being transparent to these elements of the telecommunications network.

BRIEF DESCRIPTION OF THE DRAWINGS

The present invention will be described further, by way of example only, with reference to preferred embodiments thereof as illustrated in the accompanying drawings, in which.

DETAILED DESCRIPTION OF THE INVENTION

Before describing a preferred embodiment of the present invention, an example of a wireless telecommunications system in which the present invention may be employed will first be discussed with reference to FIGS. 1 to 4.

Figure 1:
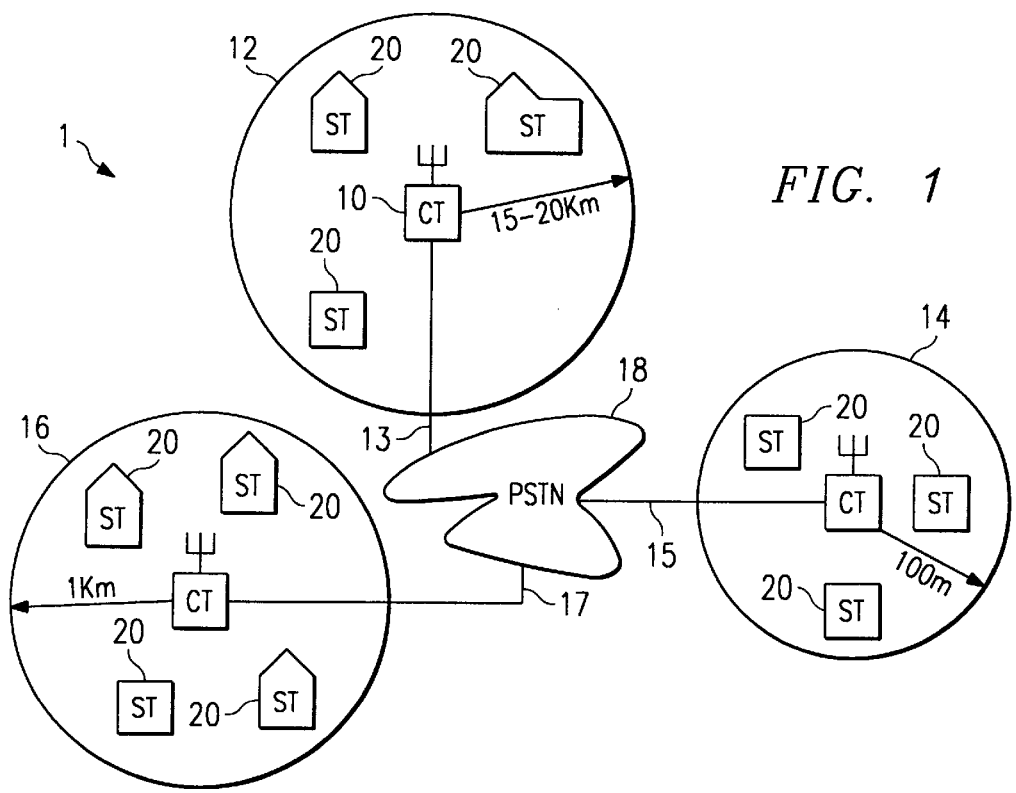
FIG. 1 is a schematic overview of an example of a wireless telecommunications system in which the present invention may be employed.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area, which is covered by a central terminal 10 can vary. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing radio links between subscriber terminals 20 at fixed locations within a service area (e.g., 12, 14, 16) and the central terminal 10 for that service area. In preferred embodiments, each subscriber terminal 20 is provided with a demand-based access to its central terminal 10, so that the number of subscribers which can be serviced exceeds the number of available wireless links.

Figure 2:
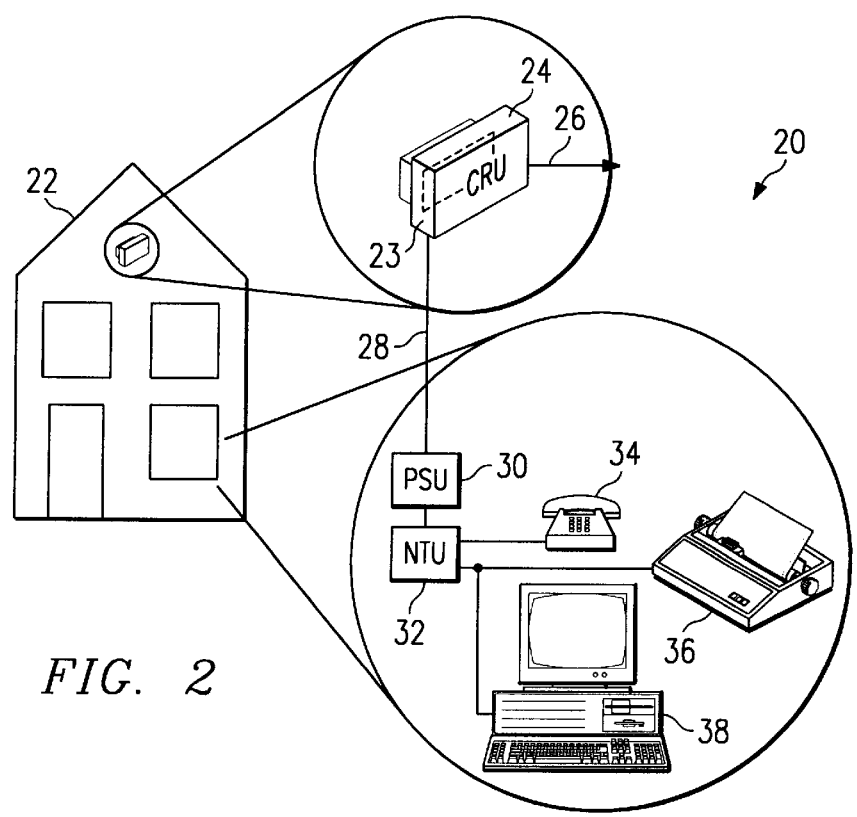
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 can support multiple lines, so that several subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
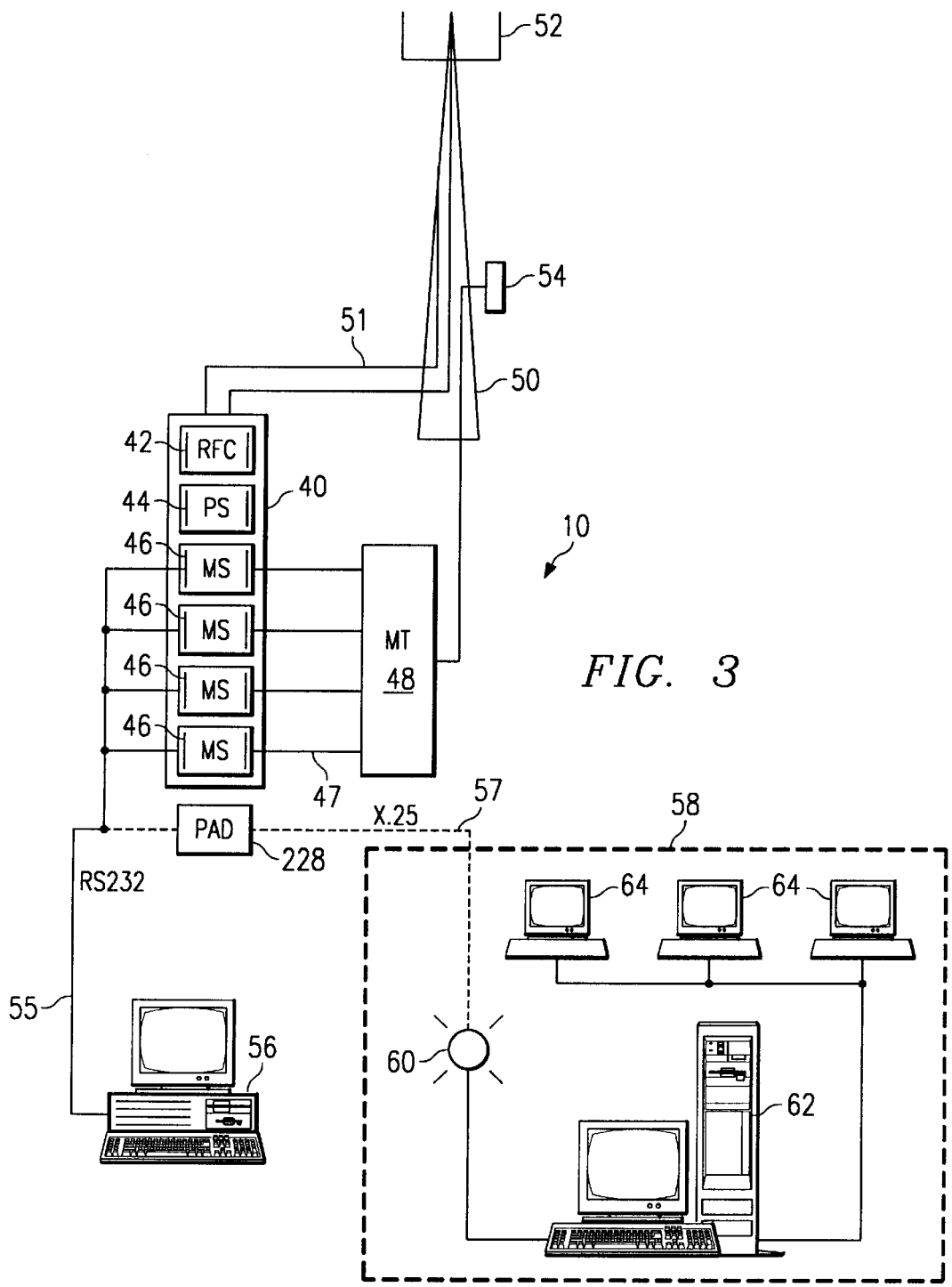
FIG. 3 is a schematic illustration of an example of a central terminal of the telecommunications system of FIG. 1.

FIG. 3 is a schematic illustration of an example of a central terminal of the telecommunications system of FIG. 1.

The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the modem shelves 46 to operate in parallel. If 'n', modem shelves are provided, then the RF combiner shelf 42 combines and amplifies the power of 'n' transmit signals, each transmit signal being from a respective one of the 'n' modem shelves, and amplifies and splits received signals 'n' way so that separate signals may be passed to the respective modem, shelves. The power supply shelf 44 provides a connection to the local power supply and fusing for the various components in the common equipment rack 40. A bidirectional connection extends between the RF combiner shelf 42 and the main central terminal antenna 52, such as an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
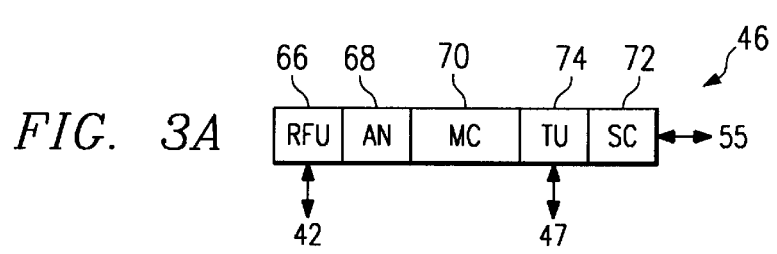
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This may include ½ rate convolution coding and x 16 spreading with "Code Division Multiplexed Access" (CDMA) codes on the transmit signals, and synchronisation recovery, de-spreading and error correction on the receive signals. Each modem card 70 in the present example has two modems, and in preferred embodiments there are eight modem cards per shelf, and so sixteen modems per shelf. However, in order to incorporate redundancy so that a modem may be substituted in a subscriber link when a fault occurs, only 15 modems on a single modem shelf 46 are generally used. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to the subscriber terminals via one of 15 of the 16 modems. Further, each modem shelf 46 includes a shelf controller 72 that is used to manage the operation of the whole of the modem shelf and its daughter network sub-elements (NSEs). The shelf controller (SC) is provided with a RS232 serial port for connection to the site controller 56 or to the pad 228. The shelf controller communicates control and data information via a backplane asynchronous bus directly with the other elements of the modem shelf. Other network sub-elements are connected via the modem cards.

Figure 4:
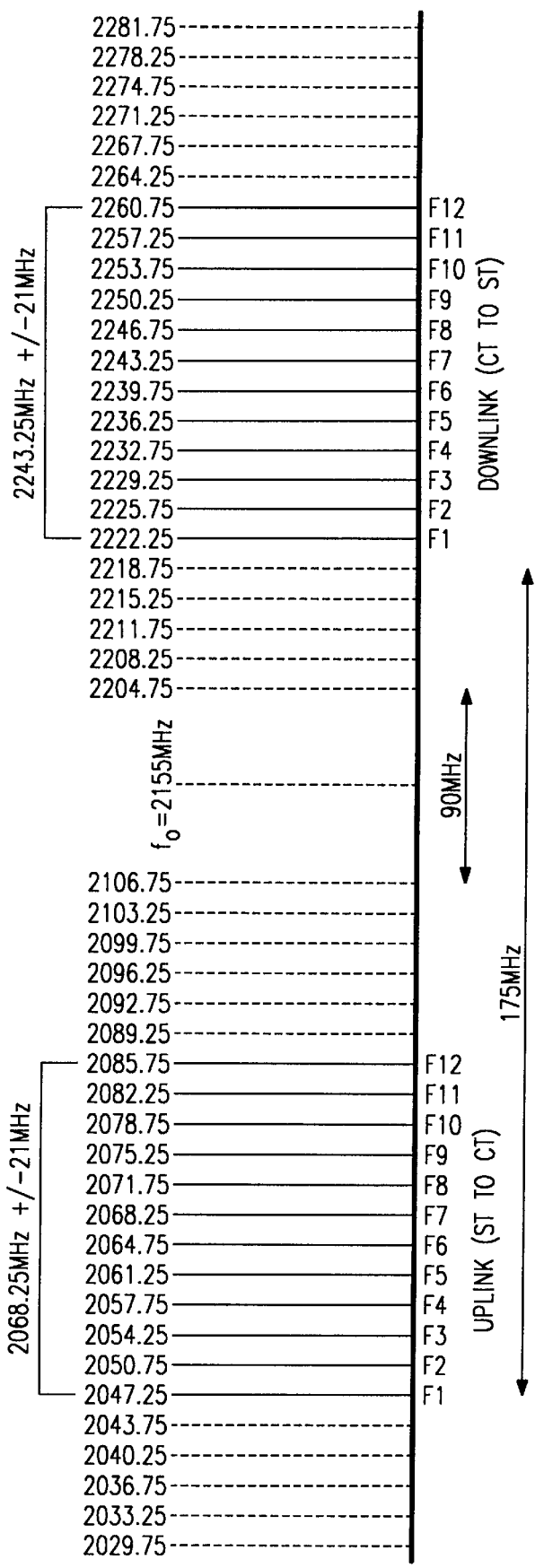
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, each modem shelf is arranged to support 1 frequency channel (i.e. one uplink frequency plus the corresponding downlink frequency), with techniques such as 'Code Division Multiplexed Access' (CDMA) being used to enable a plurality of wireless links to subscriber terminals to be simultaneously supported on a plurality of orthogonal channels within each frequency channel.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10. This is discussed in more detail in GB-A-2,301,751, which also provides further details on CDMA encoding/decoding, and on the signal processing stages employed in the subscriber terminals and central terminal to manage CDMA communications between them.

The above description has provided an overview of a suitable wireless telecommunications system in which the present invention may be employed. The techniques used in preferred embodiments of the present invention to route calls between a PSTN switch and a subscriber terminal will now be discussed. For the purposes of the present discussion, the combination of the central terminal (CT) and its associated subscriber terminals (STs) will be referred to as the "Airspan" system.

As discussed earlier, in a Demand Assignment mode of operation, far more STs can be supported than there are traffic bearing channels to handle wireless links with those STs, the exact number supported depending on the level of dial tone service that the service provider desires.

However, the use of a Demand Assignment mode complicates the interface between the central terminal and the switch of a public switched telephone network (PSTN). Hence, with reference to FIG. 5, on the switch side interface 105, the CT of the Airspan system 100 must provide services to the switch 110 as though all of the subscribers are connected with direct service even though they may not be actually acquired to a radio frequency channel. Regardless of whether the ST is acquired or not to the switch 110, all of the subscribers must have a presence at the interface 105 to the switch 110. Without some form of concentration, it is clear that a large number of interfaces to the switch would need to be provided. However, most PSTN switches still use unconcentrated interfaces, for example V5.1 or CAS, and only relatively view use concentrated interfaces, such as TR303 or V5.2.

Figure 5:
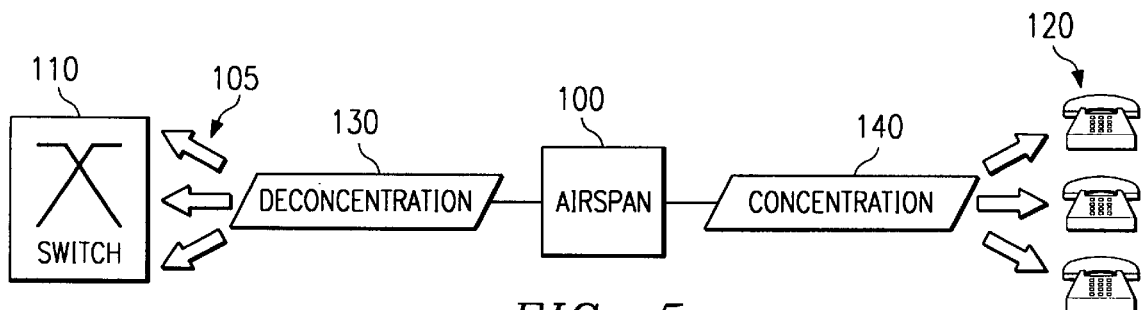
FIGS. 5 and 6 illustrate the concentration and deconcentration functions performed in preferred embodiments.

Hence, in accordance with a Demand Assignment mode of operation, it is necessary for the air interface resources between the CT and the STs to be concentrated by implementation of traffic management techniques, this being illustrated by the concentration block 140 in FIG. 5. However, if concentration is performed at the subscriber side of the Airspan system, deconcentration 130 must be provided on the switch 110 side of the system for switches that do not have concentrated interfaces such as TR303 or V5.2.

Figure 6:
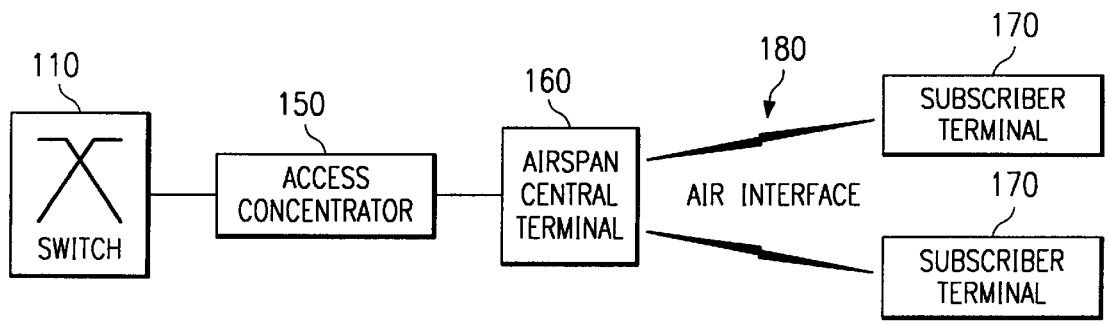

As illustrated in FIG. 6, in accordance with preferred embodiments of the present invention, an access concentrator 150 is provided to perform the concentration and deconcentration functions by providing unconcentrated interfaces to the switch 110. Concentration of the air interface resources 180 between the Airspan central terminal 160 and the Airspan subscriber terminals 170 can then be implemented to provide Demand Assignment without any adaptation of the switch hardware provided by the network operator.

Figure 7:
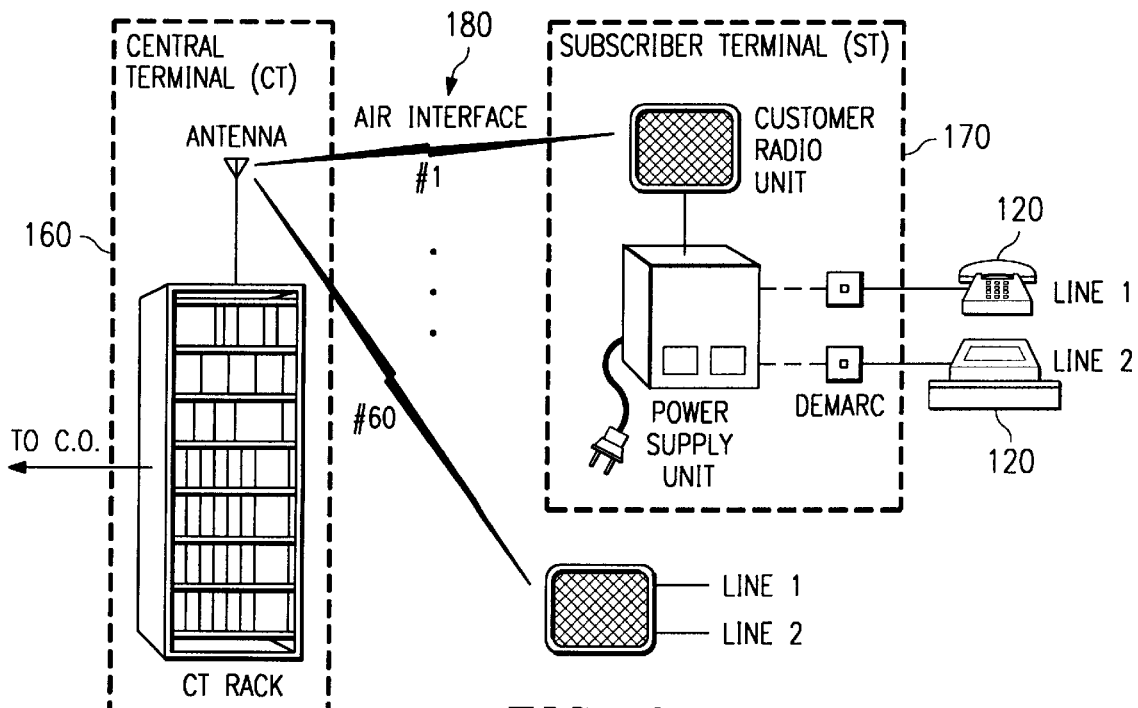
FIG. 7 illustrates a wireless telecommunications system with which a system in accordance with preferred embodiments of the present invention may be employed.

As discussed earlier, the Airspan system is a wireless local loop product which provides the functionality of a "wired" system through the use of CDMA spread spectrum radio technology. As illustrated in FIG. 7, the basic system consists of two major subsystems, namely the base station central terminal (CT) 160, and a number of subscriber terminals (STs) 170. In preferred embodiments, the CT has a digital (2 Mbit G.703/704) CAS or DASS2 interface to the switch. Further, channel banks can be used for voice frequency (VF) connectivity to the switch.

In preferred embodiments, the ST can provide 1, 2 or 4 lines to terminal blocks at the subscriber premises, commonly called the point of presence. The STs provide standard RJxx connectivity through a terminal block so that the end user can plug in their telephony appliance, for example a phone handset, a fax machine, a modem, etc, as they would with a standard copper, wired termination service.

As illustrated in FIG. 7, in a fixed assignment configuration, the Airspan system is arranged to provide full connectivity for 120×64 Kbit lines of service using sixty (60) 2×64 Kbit VF subscriber terminals. The CT then has 4×2 Mbit (4×30 channels) digital interfaces to the switch. In such a fixed assignment configuration, there is a fixed relationship between the end user service and the channel of a 2 Mbit interface to the switch.

The Airspan system preferably operates with a radio interface consisting of 4×15 traffic carrying channels of 160 Kbit/s. In the Demand Assignment embodiment, each orthogonal channel of 160 Kbit/s may be sub-divided to provide four radio slots at 40 Kbit/s each.

Further, there is a sixteenth channel that is preferably used for radio acquisition. This sixteenth channel provides the management facility to allow an ST to move to an open channel, or to be held back, for example when all channels are busy. When an ST successfully connects to the CT on the sixteenth channel, it is deemed "acquired" and is assigned one of the fifteen channels.

As mentioned earlier, the Demand Assignment function within the Airspan system enables a larger number of subscriber terminals to exist within the cell of the radio base station than there are traffic bearing radio channels to support wireless links to those subscriber terminals. The radio resources are then demand assigned to the user resources as needed. This means that instead of 60 STs connected to the CT, there could be hundreds or thousands of STs depending on the level of dial tone service the service provider desires. Further, this approach means that different users will acquire to different available channels to the switch.

Figure 8:
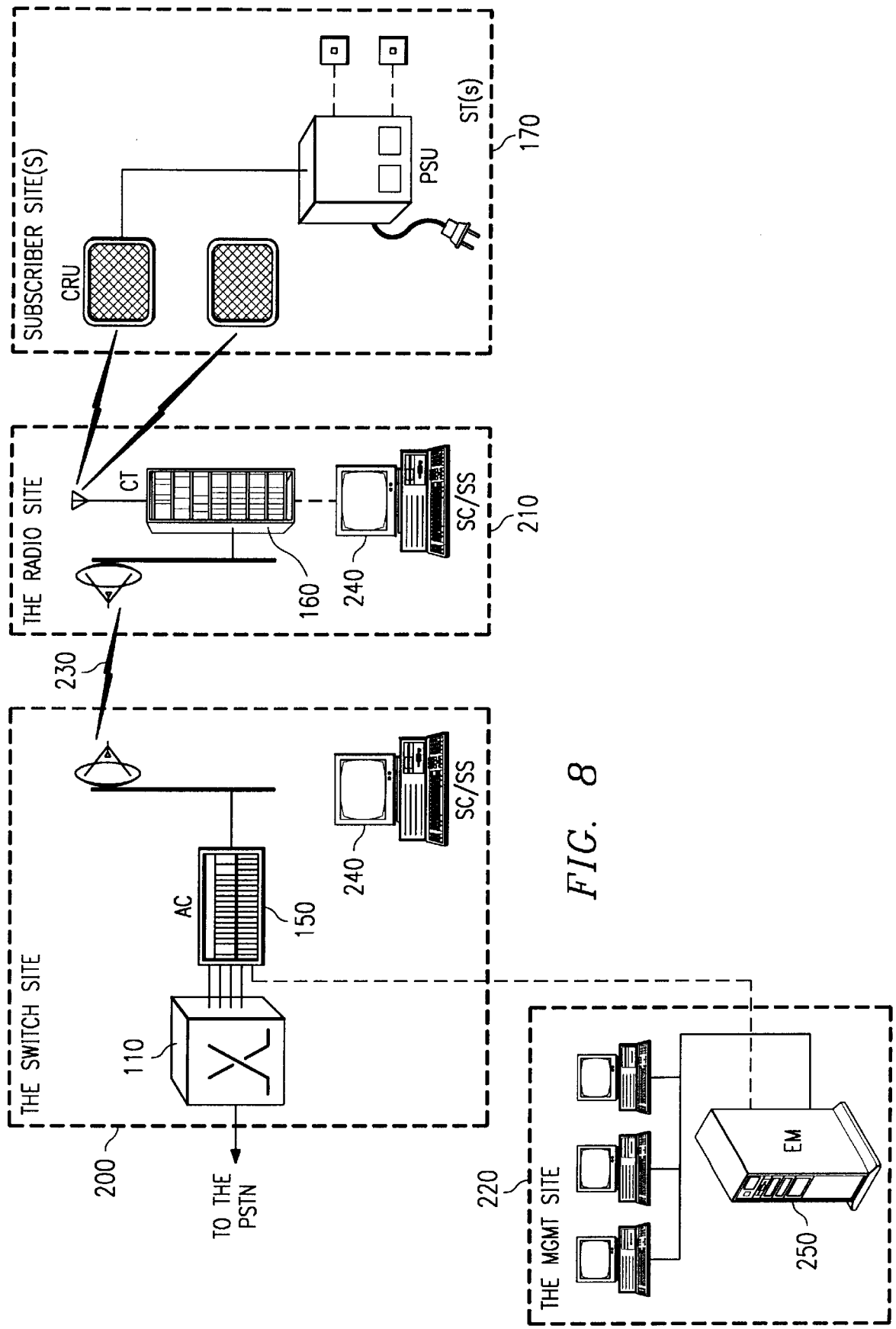
FIG. 8 illustrates a deployment of an Access Concentrator in accordance with one embodiment of the present invention.

In preferred embodiments, the access concentrator 150 illustrated in FIG. 6 is arranged to reside in the central office, next to the switch 110, and to simulate the entire user base to the switch. This preferred deployment is illustrated in FIG. 8, where the access concentrator 150 is shown connected to the switch 110 at the switch site 200. As illustrated in FIG. 8, the access concentrator 150 also provides an interface to the backhaul links 230 to the Airspan base station CT 160. In the example illustrated in FIG. 8, the backhaul 230 is provided by way of a wireless link connecting the switch site 200 to the radio site 210 containing the CT 160. Via the backhaul 230, the access concentrator 150 can build a knowledge data base of the acquired and non-acquired STs, and can provide signalling to network and to subscriber appliances. Site controllers 240 may be provided locally at the switch site 200, and/or at the radio site 210 in order to manage both, the access concentrator 150 and/or the central terminal 160. Further, the wireless telecommunications system can, in accordance with preferred embodiments, be managed via the access concentrator 150 from a remote management site 220, the management site containing a number of element managers 250 through which engineers may manage the wireless telecommunications system.

The access concentrator 150 must be able to handle a user's call data irrespective of which radio link on the digital interface to the switch side of the central terminal 160 that call data arrives on. In preferred embodiments, the CT modem shelves use digital interfaces, such as concentrated V5.2 interfaces, running at 2 Mbits. This equalises the bandwidth of the CT-ST radio links and the backhaul 230 to the switch site 200. Any user can appear on any channel on the radio side of the central terminal 160, and can therefore appear on any of the 120 total channels on the switch side of the central terminal via the concentrated interface specification, for example the V5.2 specification.

Concentrated interfaces such as the V5.2 interface allow the Airspan system to provide caller information within the signalling overhead of the 2 Mbit signal. This provides the flexibility for any caller to be using any channel within the 2 Mbit signal. This equals the system functionality over the air interface where any caller's call data can arrive on any of the bearer radio channels once acquired, this function being termed "frequency agility".

The access concentrator 150 then provides concentrated connectivity to the backhaul 230 and the central terminal 160, whilst providing unconcentrated connectivity to the switch 110. To do this, the access concentrator 150 of the preferred embodiment manages all of the signals at the 64 Kbit level. It then allows a cross-connection capability from the concentrated interface to unconcentrated interfaces on demand and in real time.

Figure 9:
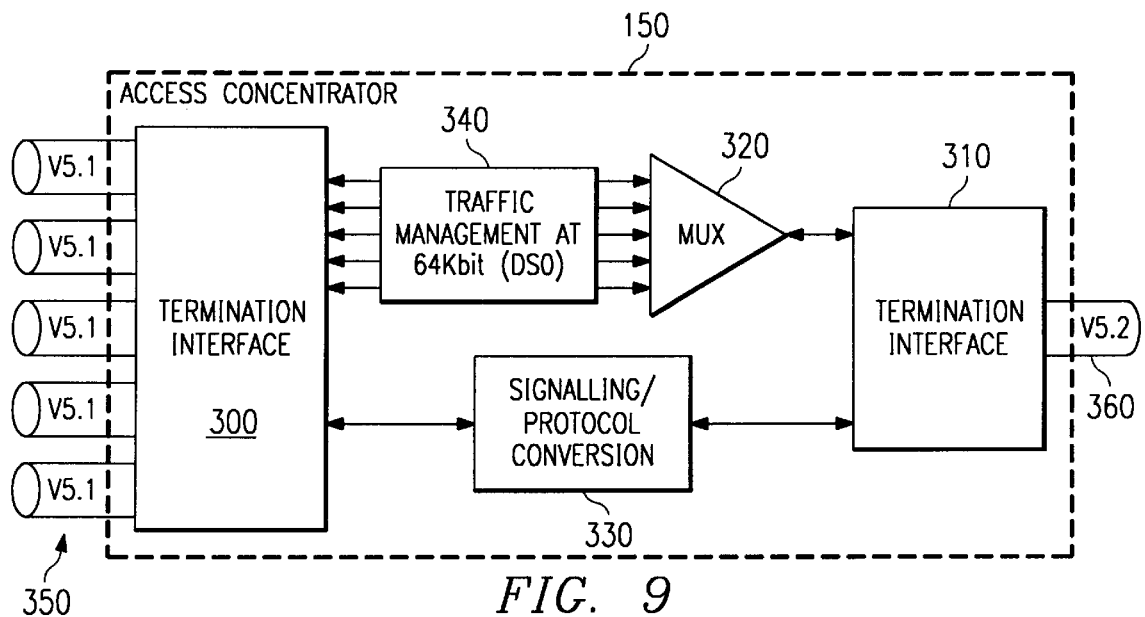
FIG. 9 is a block diagram illustrating the main functional elements of an Access Concentrator in accordance with preferred embodiments of the present invention.

FIG. 9 is a block diagram illustrating the main functional elements of the access concentrator 150 used to convert a signal from a concentrated protocol such V5.2 into an unconcentrated protocol such as V5.1. The key to the application of the access concentrator is that it must provide a series of unconcentrated interfaces to the switch side interface 350. There are several applications which drive this requirement; for example the unconcentrated interface of the access concentrator may need to connect to applications such as an interface to channel banks, an interface to digital switches, an interface to multiplexers, or an interface to transmission equipment for backhaul connections. Since the access concentrator preferably has a cross-connection capability at the 64 Kbit DS0 level, the 64 Kbit channels can be "wrapped" in any protocol standard or multiplexing level, and so the flexibility of the system to have any interface type is inherent.

New digital interfaces are primarily V5.1 for lower cost. Conversion from V5.2 to V5.1 primarily consists of cross-connecting at the 64 Kbit level and signalling using V5.1 specifications.

Each 160 Kbit orthogonal channel incorporates 2×64Kbit/s traffic channels, a 16Kbit signalling channel for containing signalling information for each frame of information transmitted, and a 16 Kbit overhead channel for carrying control information used to establish and maintain the downlink and uplink communication paths. It will be appreciated that, through the use of compression techniques, it is possible to provide more traffic channels within each orthogonal channel, for example 4×32 Kbit traffic channels rather than 2×64 Kbit channels.

As illustrated in FIG. 9, incoming call information is received as a termination interface 300 in an unconcentrated protocol 350, such as V5.1. The traffic bearing channels are extracted from the non-traffic bearing channels by the termination interface 300, and passed to a traffic management element 340. Hence, if a non-traffic bearing channel such as a signalling channel occupies every nth bit position in the signal, this non-traffic bearing channel can be extracted by appropriate timing techniques used to identify every nth bit in the signal.

In preferred embodiments, the traffic management element manages the traffic bearing channels at the 64 Kbit level, and is arranged to perform a cross-connection function in order to map those traffic bearing channels to the appropriate format required by the concentrated protocol, for example V5.2. The traffic bearing channel information is then passed through a multiplexer 320 to generate a single signal path which is passed to the termination interface 310.

Whilst the above process is being performed on the traffic bearing channels, the non-traffic bearing channels are passed from the termination interface 300 to the signalling/protocol conversion element 330. Here, predetermined protocol conversion steps are applied to the non-traffic bearing channels in order to regenerate those non-traffic bearing channels in the concentrated protocol. The non-traffic bearing channel information is then passed to the termination interface 310. Within the termination interface 310, the traffic bearing and non-traffic bearing channels are combined, and the combined signal is then output in the second protocol along path 360.

It will be appreciated by those skilled in the art that the same functions can be performed in reverse in order to convert a signal in a concentrated format such as V5.2 into an unconcentrated format such as V5.1, this being indicated by the bidirectional arrows in FIG. 9.

Figure 10:
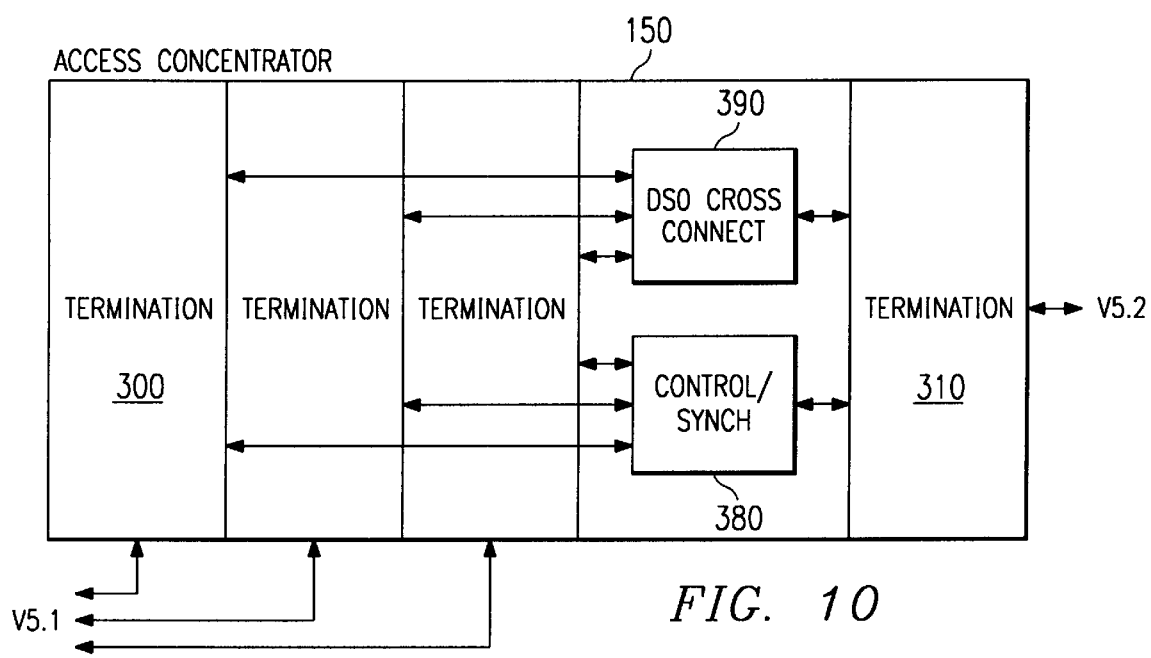
FIGS. 10 to 12 show some alternative deployments of the Access Concentrator of preferred embodiments.

FIG. 10 is a simplified block diagram of the access concentrator 150, showing the termination interfaces 300 and 310, and the functions used to handle the traffic bearing, and non-traffic bearing, channels separately from one another. The traffic bearing channels are passed through the DS0 cross-connection functional block 390, this including the traffic management element 340 and the multiplexer 320 illustrated in FIG. 9, whilst the non-traffic bearing channels are passed through the control/synch functional block 380, this including the signalling/protocol conversion element 330 illustrated in FIG. 9.

Figure 11:
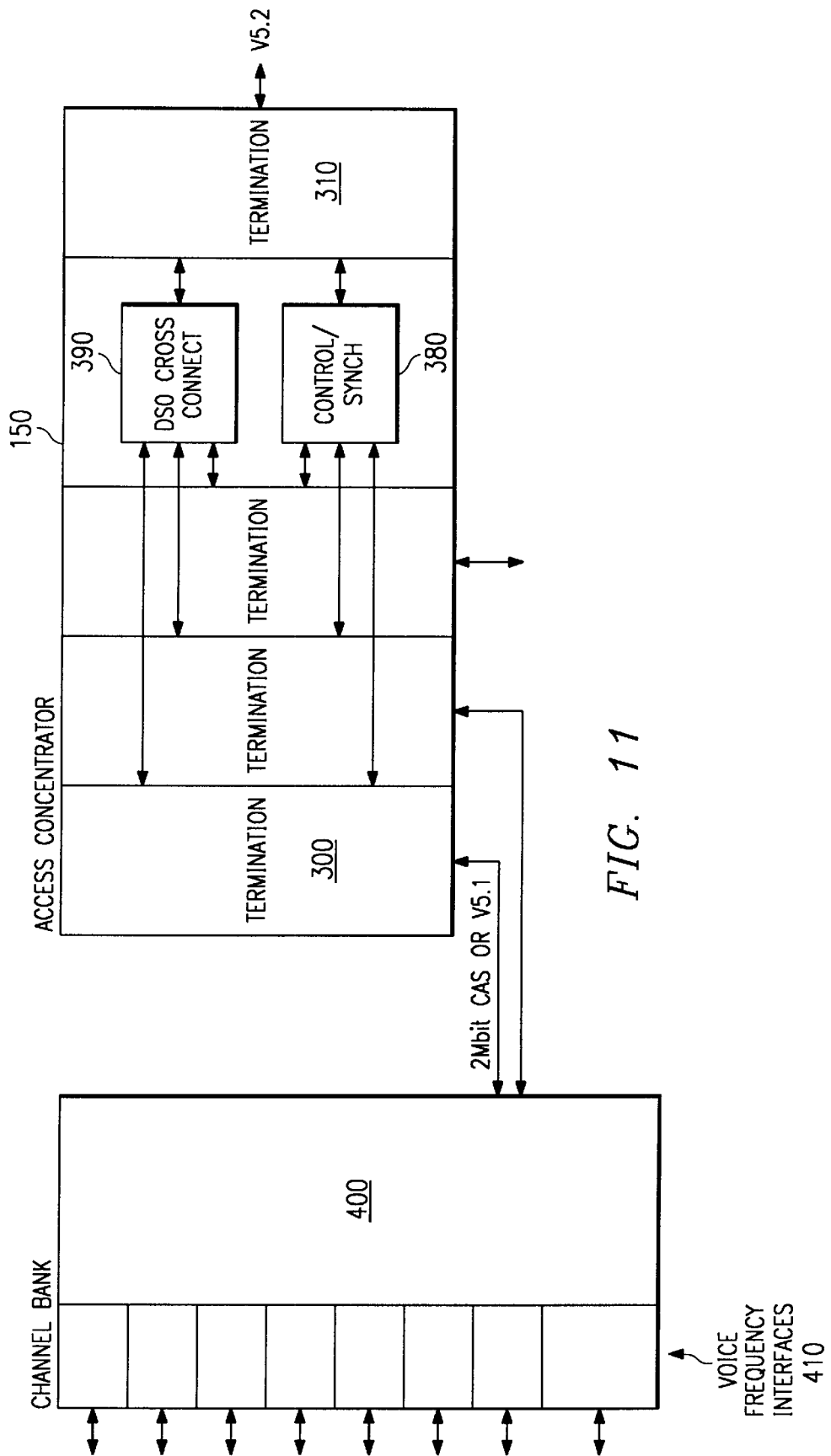

In some countries, there is a requirement for VF or CAS interfaces to the telephone switches. As will be appreciated by those skilled in the art, the VF interface can be provided by the use of channel bank applications However, these channel bank applications require a standard 2 Mbit CAS interface. Hence the access concentrator 150 can be arranged to convert concentrated protocol signals such as V5.2 signals into CAS signals, and the CAS output signals can then, if required, be input into a channel bank facility 400 arranged to provide VF interfaces 410. This arrangement is illustrated in FIG. 11.

Figure 12:
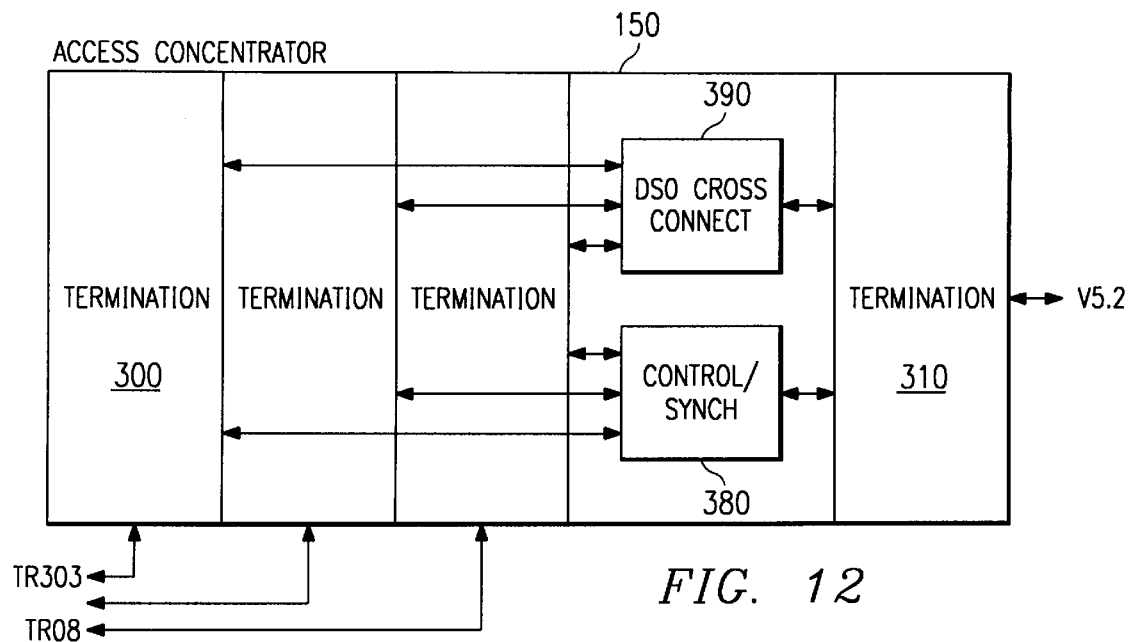

In North America or Taiwan, the telephone switches are typically arranged to use T1 standards, and hence there is a requirement to use TR303 (the North American version of V5.2) or TR08 (North American version of CAS) to interface to those types of switches. Hence, as illustrated schematically in FIG. 12, the access concentrator 150 can be used to convert between V5.2, and interfaces such as TR303 and TR08.

Figure 13:
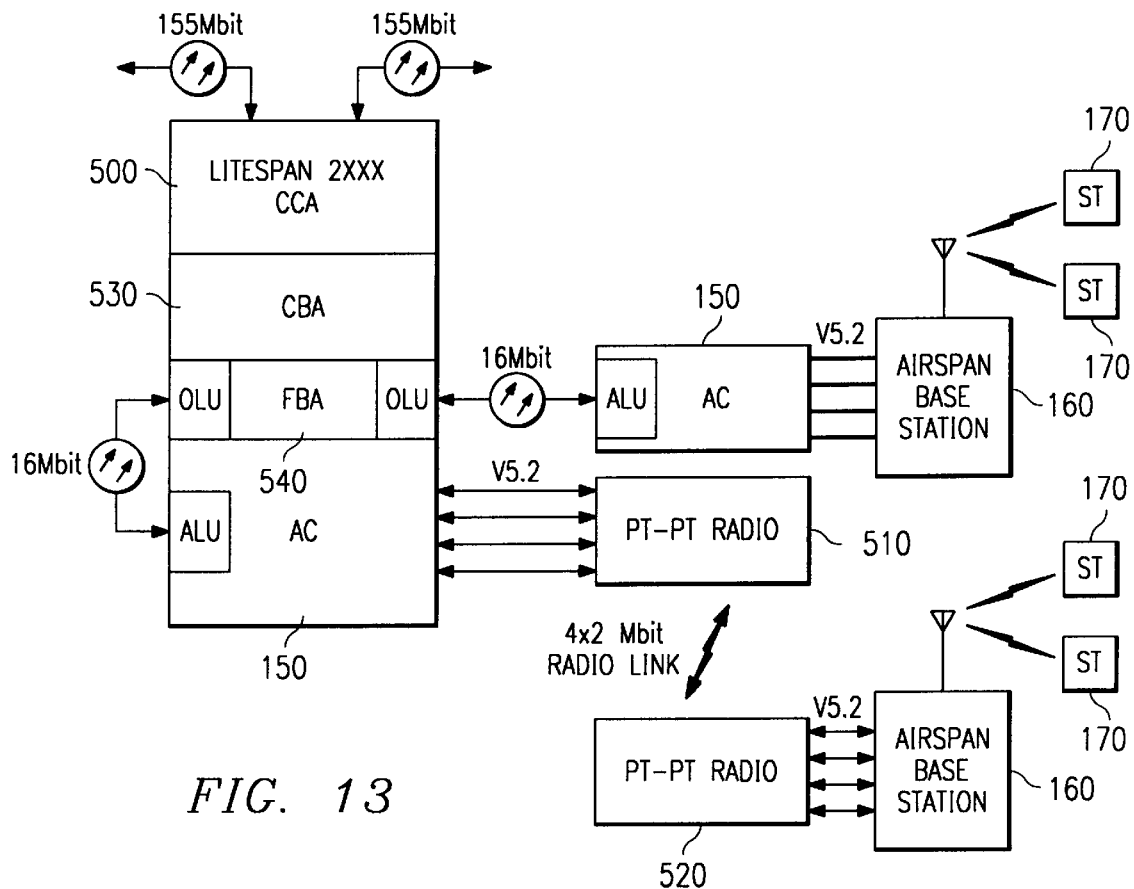
FIG. 13 illustrates deployments of an Access Concentrator in accordance with an alternative embodiment of the present invention.

In addition to using the access concentrator to interface between an unconcentrated PSTN switch and a Demand Assignment wireless telecommunications system, such as that provided by the Airspan central terminal and subscriber terminals, it is also envisaged that the access concentrator can be used to provide an interface mechanism for connecting other items of telecommunications equipment. One example of such a piece of telecommunications equipment is the "Litespan" product produced by DSC Communications Corporation. The Litespan family of products use a central processor and a ring or transport shelf combined with a variety of "Bank" assemblies. With reference to FIG. 13, the Bank assemblies of the Litespan product 500 may include a channel bank assembly 530 with VF and wireline services, and a fiber bank assembly 540 for extension of fiber optic capabilities to the curb network units.

The access concentrator of preferred embodiments can use the Airbank Line Unit (ALU) card combining the Subscriber Bus Interface (SBI) translation function and the Optical Line Unit (OLU) to interface directly into the Litespan product platform. As illustrated in FIG. 13, an Airspan wireless telecommunications system comprising a base station CT 160 and subscriber terminals 170 may be connected to an access concentrator 150 via a concentrated protocol such as V5.2, and the access concentrator 150 can then be connected directly with the fiber bank assembly 540 of the Litespan product 500 via an ALU/OLU connection.

In addition, or alternatively, an access concentrator 150 can be provided within the Litespan product 500, and internally connected to the fiber bank assembly 540 via an ALU/OLU connection. In this case, a point to point radio connection 510, 520 can be used to enable an Airspan central terminal 160 to communicate via a concentrated protocol such as V5.2 with the access concentrator 150 within the Litespan product 500.

The above described technique enables the function of the Litespan product to be combined with the Airspan system so as to offer a digital, VF, optical and radio based access platform.

As mentioned earlier, compression technology may be used to provide more traffic channels within each orthogonal channel of the wireless telecommunications system. Compression involves the reduction of capacity through techniques such as 32 Kbit ADPCM ("Adaptive Differential Pulse Code Modulation" compression (64 Kbit/s is compressed to 32 Kbit/s) or even higher 8 Kbit compression (64 Kbit/s is compressed to 8 Kbit/s), this further increasing the number of users that may be supported by a single subscriber terminal.

Hence, if a 32 Kbit compression technique is employed, such that the granularity of the Demand Assignment system provides a 32 Kbit traffic bearing channel on the radio interface, it is possible to arrange the access concentrator to allocate bandwidth resources at the 32 Kbit level instead of at the 64 Kbit level described earlier. However, the same rules will apply as apply for the concentration/deconcentration functions when it comes to interfacing to the switch. Whatever techniques are applied at the subscriber side of the telecommunications system must be reversed at the switch side, and vice versa.

Figure 14:
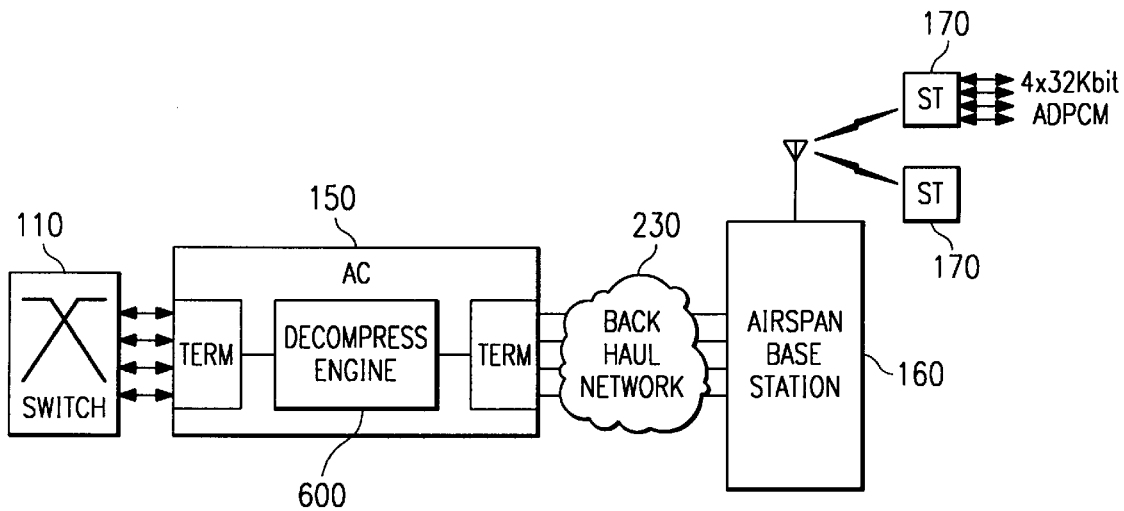
FIG. 14 illustrates the use of a compression/decompression engine in Access Concentrators of preferred embodiments.

FIG. 14 is a schematic illustration of a deployment which employs compression techniques to provide 32 Kbit traffic bearing channels on the radio interface. As illustrated in FIG. 14, compression of the subscriber appliance bandwidth will be performed at the ST 170, in order to provide up to 4×32Kbit ADPCM compressed channels at the ST. Additional compression/decompression engines 600 may then be installed as necessary within the access concentrator 150 in order to provide compression support as necessary within the cross-connection bus/signals of 64 Kbit/s. With reference to FIG. 9 discussed earlier, the compression/decompression engine would preferably be positioned between the multiplexer/demultiplexer 320 and the traffic management element 340. Hence, a concentrated signal would be demultiplexed, then decompressed, and then the cross-connection/management function would be applied.

Figure 15:
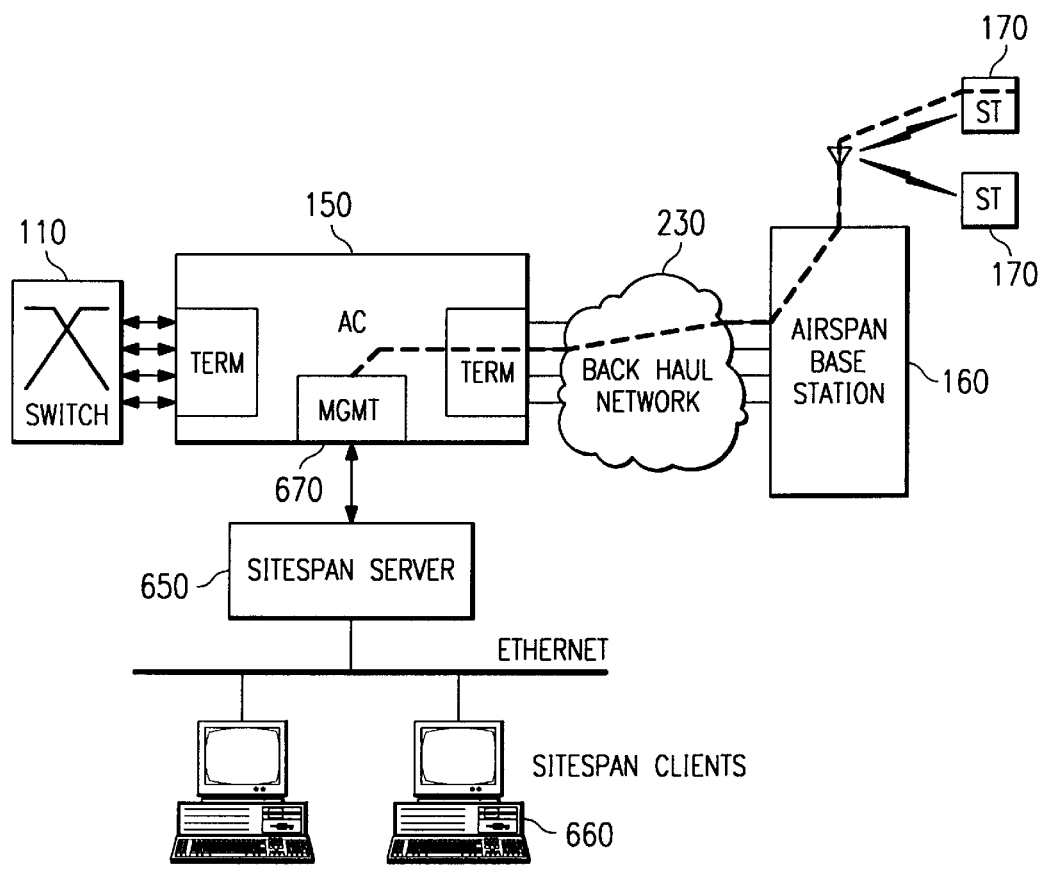
FIG. 15 illustrates the use of a management system interfacing with the Access Concentrator in order to provide management facilities in accordance with preferred embodiments.

In current wireless telecommunications systems, the management interface typically exists at the central terminal, with one management connection being provided for each modem shelf of the central terminal. However, in accordance with the access concentrator 150 of preferred embodiments, the interface to the management systems is actually provided at the access concentrator 150, the concentrated interface specifications allowing management data to be essentially in-band with the bearer traffic. As illustrated in FIG. 15, management data will hence be passed over the backhaul 230 via the overhead signalling of the concentrated protocol, for example V5.2, and a management interface 670 within the access concentrator 150 will then be provided for enabling management systems, such as the "SiteSpan" system developed by DSC Communications Corporation, to be connected to the access concentrator. The various management issues arising from the concentration of air interfaces, the compression of signals, and the large number of subscriber terminals, can then be managed centrally via the access concentrator 150. A connection such as an RS232 connection may be made between the access concentrator and the server 650 of the SiteSpan system.

Figure 16:
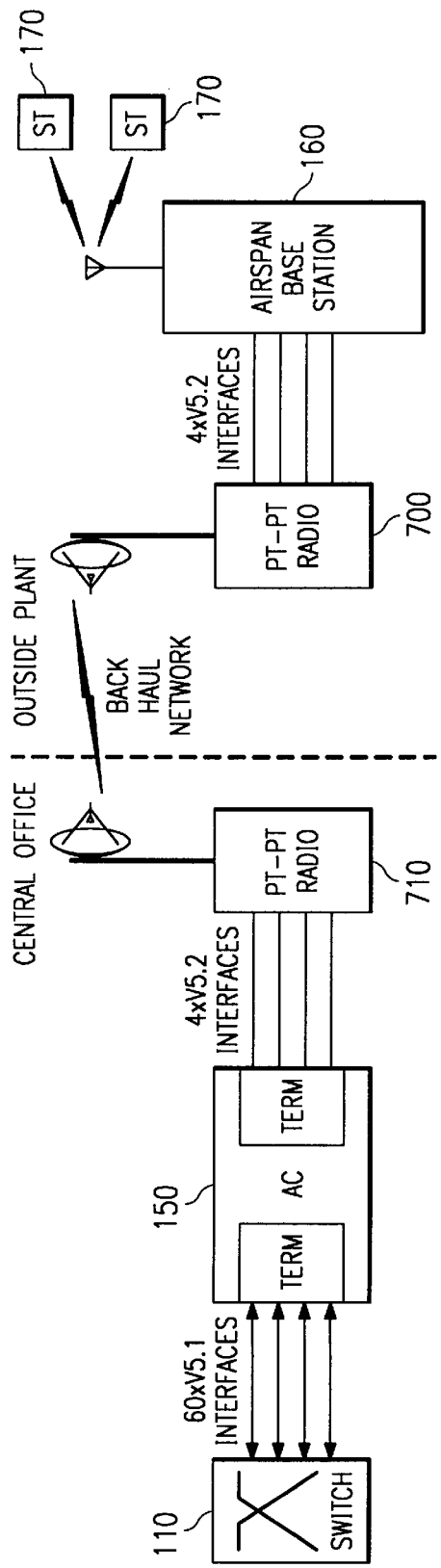
FIGS. 16 and 17 illustrate the use of a backhaul network in accordance with preferred embodiments.

Another problem which can be alleviated by the use of the access concentrator of preferred embodiments is that of backhaul costs. The backhaul is the portion of the telecommunications network which can be used to connect the base station central terminal 160 with the central office containing the switch 110. Due to market requirements, most of the Airspan installations have base station sites which are not co-located with the central offices. Typically the location of the Airspan installation will be a mountainside or other remote location broadcasting onto the served area. To minimise the cost, it is preferred that the backhaul technology use concentrated interfaces. Further the backhaul technology must be fully compatible with point-to-point radios and or ring and non-ring based multiplexers. By using the access concentrator 150 of preferred embodiments, a backhaul implementation can be provided as illustrated in FIG. 16. With reference to FIG. 16, it will be seen that only 4×2 Mbit (V5.2) links are required to connect the access concentrator 150 and the base station 160 via a point-to-point radio link 700, 710 forming the backhaul.

Figure 17:
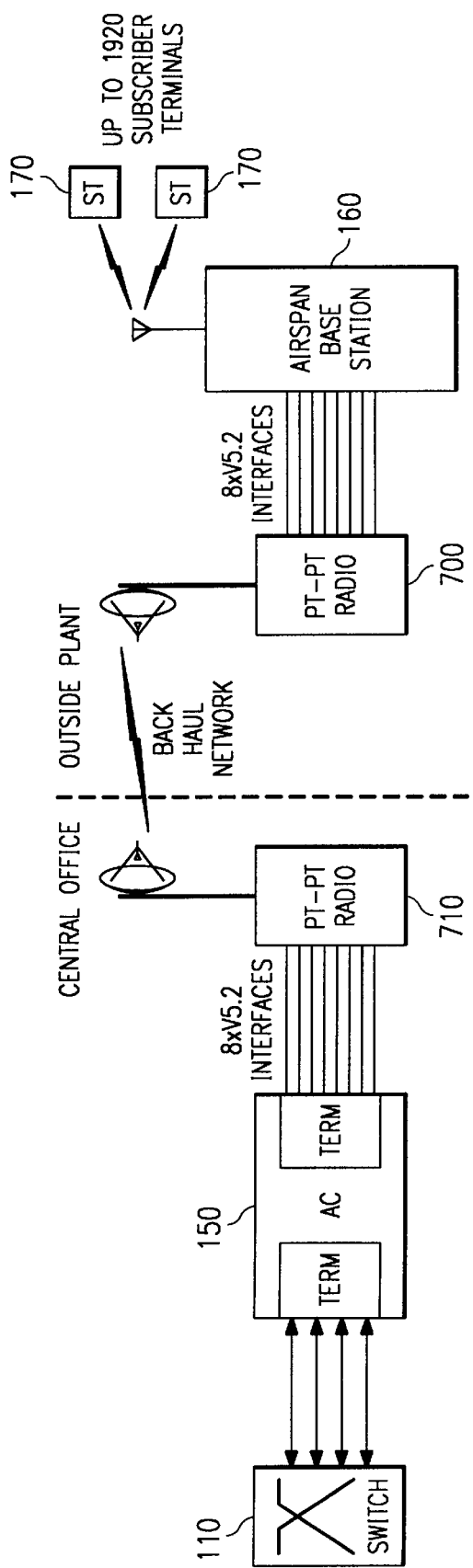

This will be sufficient for many implementations. However, for a fully configured 2000 subscriber application as illustrated in FIG. 17, the backhaul will preferably utilise 8×2 Mbit (V5.2) links.

Whilst much of the above description has concentrated on the use of the access concentrator in combination with a Demand Assignment wireless Airspan system, it may also be used as a stand-alone unit which utilises standard concentrated and unconcentrated interfaces such as V5.2, V5.1 and CAS. This allows the access concentrator to be utilised as an element in any variety of network applications where signals/protocol conversion is required.

Where switches become more and more populated with digital and then concentrated interfaces, the access concentrator of the preferred embodiments will be able to be used to enable possible cost reduction for network operators who wish to maximum their equipment interoperability.

The access concentrator of preferred embodiments may also be used to alleviate a critical problem which will arise from the addition of Wireless Local Loop technology in a telecommunications network. A typical telephone network sub divides areas served into switch locations. Each area is then served by a central office containing fundamental network building blocks, with the central offices being tied together in transmission networks allowing inter-switch traffic connectivity. These fundamental building blocks may include:
  a switching fabric (the switch);
  transport mechanisms (fiber optic terminals, transmission equipment);
  access equipment (multiplexers, distribution systems); and
  cross-connection technology (4/1 or 1/0 cross-connects).

Figure 18:
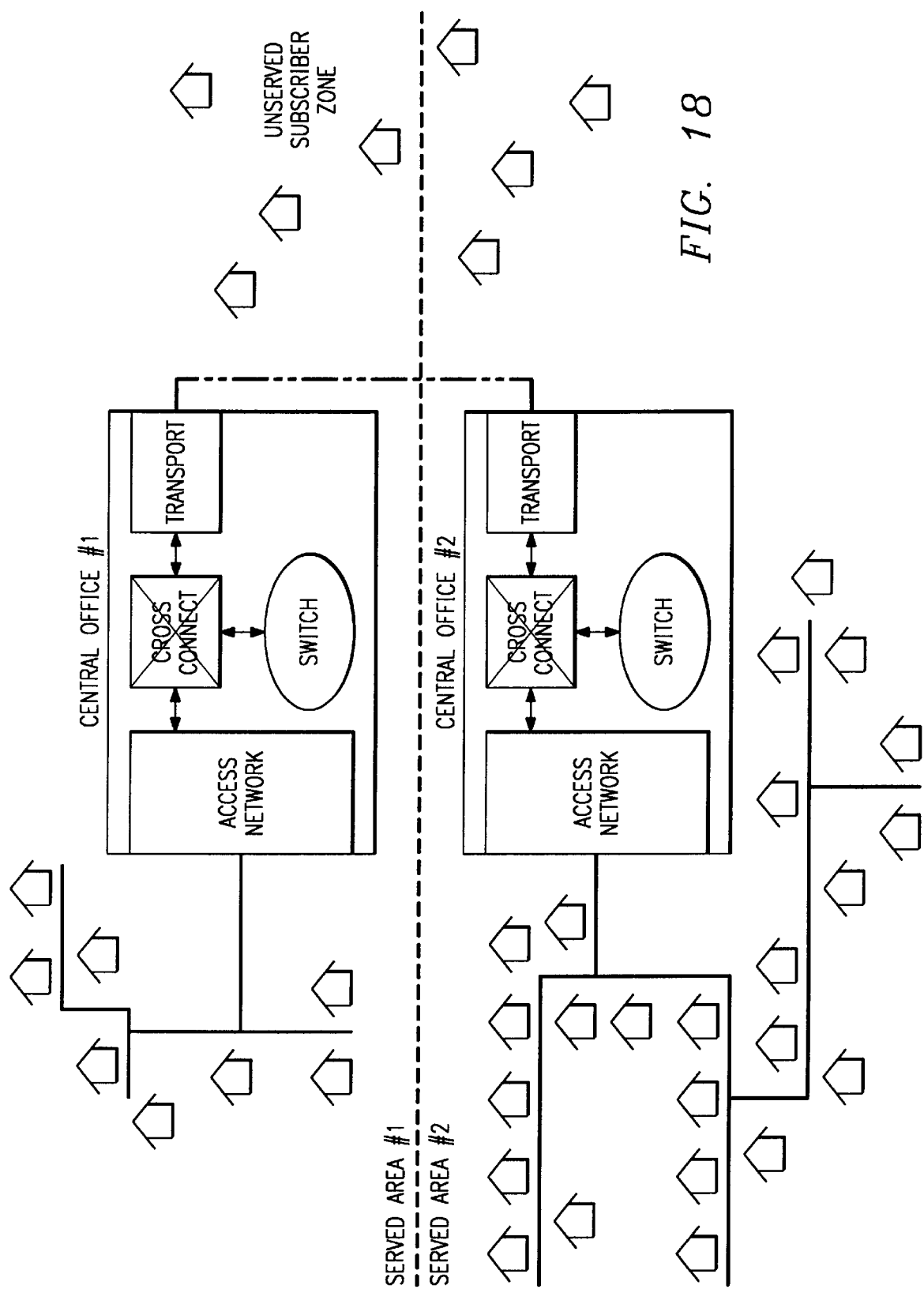
FIG. 18 illustrates a standard wired telecommunications network.

Based primarily on existing copper based media, the architecture of the local access system is carefully planned and managed to meet end user needs whilst also meeting cost requirements. An example of a standard network having two central offices is illustrated in FIG. 18. As illustrated in FIG. 18, there are some unserved subscribers that reside in a zone that does not yet have the necessary copper based infrastructure. Wireless LocaL Loop technology enables these outlying areas to be easily reached, and may be employed as a swiftly implemented overlay to provide expansion of service where not enough copper exists, or the cost of installing more copper and/or fiber links has not yet been proven to be worthwhile.

Figure 19:
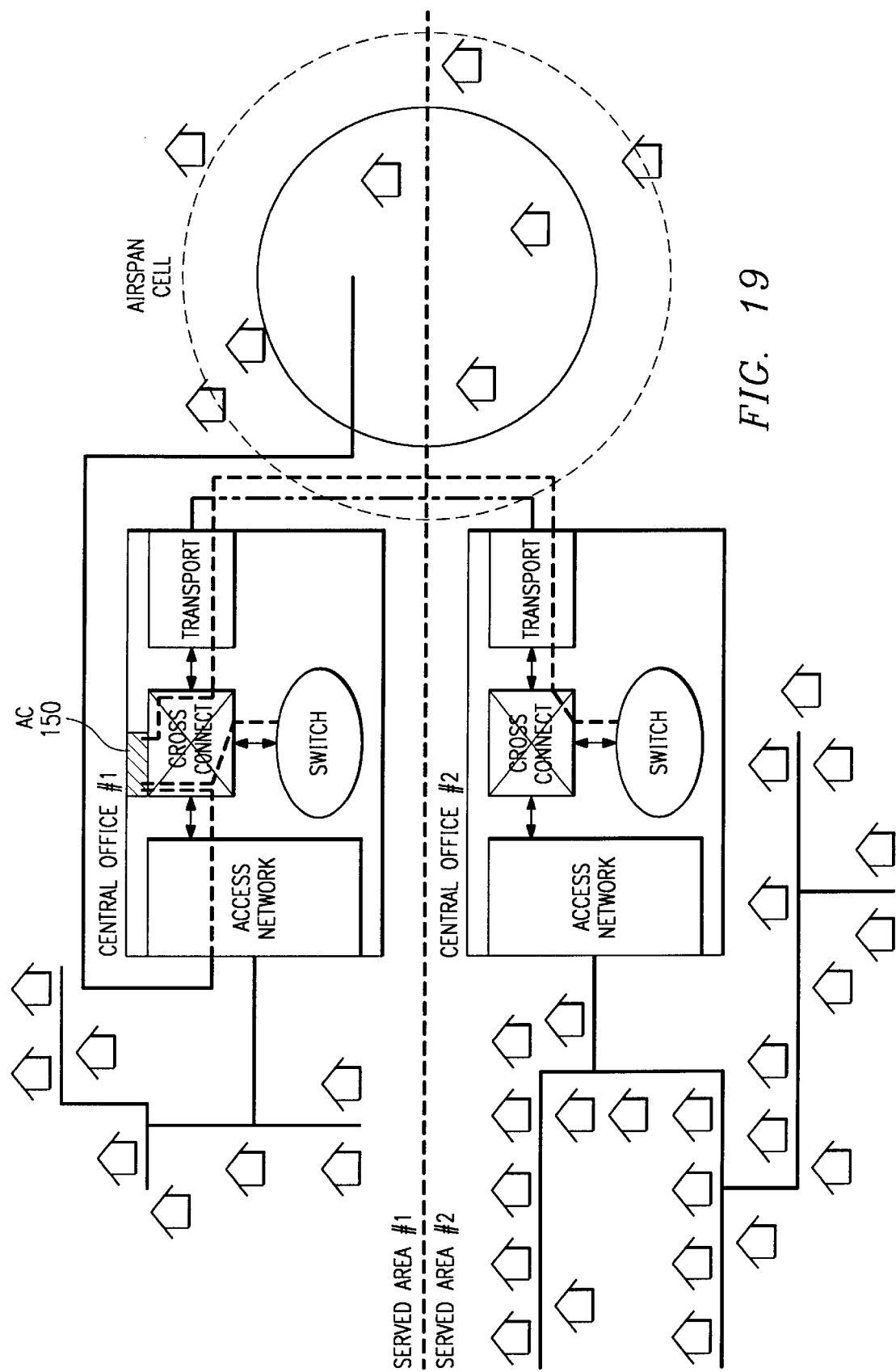
FIGS. 19 and 20 illustrate how an Access Concentrator may be employed in one embodiment of the present invention to enable a wireless telecommunications system to be used to service otherwise unserviced users in the telecommunications network of FIG. 18.

However, one of the problems this introduces is that the cell of the wireless telecommunications system may extend across and beyond the previous sub divided areas. This is illustrated in FIG. 19, in which an Airspan cell has been provided to cover the previously unserved area. Now, users may be reached from an undesired switch location. This traffic, which must be re-routed to another switch location, will, in accordance with preferred embodiments, be handled at the 64Kbit level, which is not supported by 4/1 cross-connects.

However, by using the access concentrator 150 of preferred embodiments, the access concentrator can be employed to re-route these calls to a dedicated 2 Mbit output for cross-connection and re-routing to the appropriate switch. In this sense, the access concentrator 150 becomes an on-demand extension of the 4/1 cross-connect without having to pay for a 1/0 cross-connect fabric. Additionally, since the access concentrator can be employed to perform protocol conversion, the translation capabilities of signals within 2 Mbit cross-connects can be added to the cross-connect function and managed into the network services.

Figure 20:
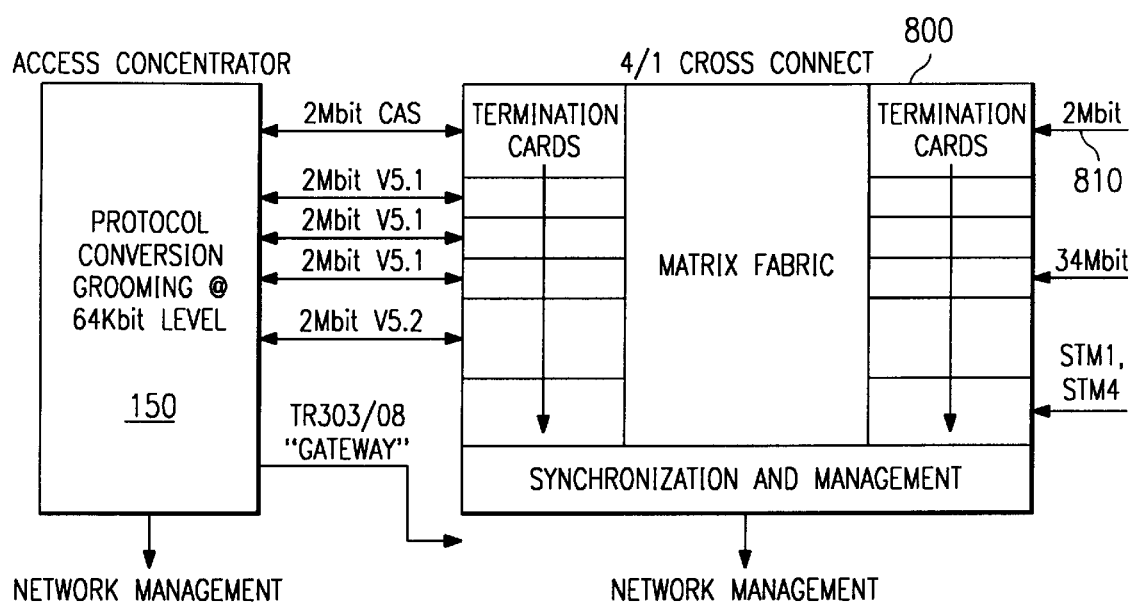

FIG. 20 illustrates the use of the access concentrator 150 as an on-demand extension of the 4/1 cross-connect facility 800. The 4/1 cross-connect facility 800 is a computer-managed digital connector for connecting certain input lines to certain output lines. A cross-connect performs this cross-connection function without being concerned with the content of the signals on the input and output lines. Hence, if a 2 Mbit signal 810 enters the cross-connect, it will be routed out on an output line as the same 2 Mbit signal.

However, by employing the access concentrator 150, the 2 Mbit signal 810 can be passed to the access concentrator, and any protocol conversion supported by the access concentrator can then be applied to the signal. Hence, for example, a 2 Mbit V5.2 signal can be converted within the access concentrator 150 to a 2 Mbit CAS signal. The converted signal can then be returned to the 4/1 cross-connect facility 800 for routing to the appropriate output line. This enables traffic signals to be efficiently re-routed from one switch location to another, and in the protocol required by the destination switch location.

The access concentrator 150 can also provide certain 'grooming' functions to enable efficient use of resources. For example, if two 2 Mbit signals are received by the cross-connect facility 800, and these two signals are only using 10 of the 30 available channels within the 2 Mbit: signal, the access concentrator 150 can combine these signals to produce one 2 Mbit output signal using 20 of the 30 available channels.

As illustrated in FIG. 20, both the access concentrator 150 and the 4/1 cross-connect can be provided with links to a network management facility, such as DSC Communications Corporation's SiteSpan product, thereby enabling centralised management of these elements.

Although a particular embodiment has been described herein, it will be appreciated that the invention is not limited thereto and that many modifications and additions thereto may be made within the scope of the invention. Fcr example, various combinations of the features of the following dependent claims could be made with the features of the independent claims without departing from the scope of the present invention.

What is claimed is:

1. A system for handling telecommunications signals passed between a first and second element of a telecommunications network, the first element having an interface for transmitting and receiving signals in a first protocol, and the second element having an interface for transmitting and receiving signals in a second protocol, the system comprising:

a first interface unit for receiving a first telecommunications signal transmitted in one of said first and second protocols between said first and second elements, the first interface unit being arranged to separate traffic bearing channels from non-traffic bearing channels within the first telecommunications signal;

a traffic management element for separately performing a cross-connection function to map the traffic bearing channels to the appropriate format for the other of said protocols;

a protocol conversion element for separately performing predetermined protocol conversion steps on the non-traffic bearing channels in order to regenerate those non-traffic bearing channels in the other of said protocols; and a second interface unit for combining the traffic bearing channels as output by the traffic management element and the non-traffic bearing channels as output by the protocol conversion element in order to create a second telecommunications signal in the other of said protocols, the second interface unit being arranged to output the second telecommunications signal.

2. A system as claimed in claim 1, wherein the traffic management element is arranged to perform the cross-connection function at the 64 Kbit level.

3. A system as claimed in claim 1, wherein said first protocol has a concentrated format, and said second protocol has an unconcentrated format.

4. A system as claimed in claim 3, wherein the first protocol is V5.2, and the second protocol is V5.1.

5. A system as claimed in claim 3, wherein the first protocol is V5.2, and the second protocol is CAS.

6. A system as claimed in claim 5, wherein the second element has a voice frequency (VF) interface, and the system further comprises a channel bank application for receiving the CAS signals output by the second interface unit and for converting said CAS signals in to VF signals for outputting from one or more VF interfaces to the second element.

7. A system as claimed in claim 3, wherein the first protocol is V5.2, and the second protocol is TR08.

8. A system as claimed in claim 1, wherein the first protocol is V5.2, and the second protocol is TR303.

9. A system as claimed in claim 1, wherein the traffic management element is arranged to perform any conversion steps required to map the traffic bearing channels between the formats of the first and second protocols.

10. A system as claimed in claim 1, further comprising a multiplexer/demultiplexer element for multiplexing traffic bearing channels output by the traffic management element for transmission to the first element, and for demultiplexing traffic bearing channels received in signals from the first element prior to those traffic bearing channels being processed by the traffic management element.

11. A system as claimed in claim 1, further comprising a compression/decompression engine for performing any compression and/or decompression functions required to convert the first telecommunications signal in to the second telecommunications signal.

12. A system as claimed in claim 10, wherein the compression/decompression engine is located between the traffic management element and the multiplexer/demultiplexer element.

13. A system as claimed in claim 1, further comprising a management interface for connecting the telecommunications system with a management system, the management system being arranged to send data to the management interface for insertion in to the signals sent in the first protocol to the first element.

14. A system as claimed in claim 1, wherein said first element is a central terminal of a wireless telecommunications system, and said second element is a switch of the telecommunications network.

15. A system as claimed in claim 14, wherein the system is located at a central office containing the switch, and is arranged to communicate with the central terminal via a backhaul facility using the first protocol.

16. A system as claimed in claim 1, wherein said first element is a central terminal of a wireless telecommunications system, and said second element is a fiber bank assembly.

17. A method of handling telecommunications signals passed between a first and second element of a telecommunications network, the first element having an interface for transmitting and receiving signals in a first protocol, and the second element having an interface for transmitting and receiving signals in a second protocol, the method comprising the steps of:

receiving a first telecommunications signal transmitted in one of said first and second protocols between said first and second elements;

extracting traffic bearing channels from the first telecommunications signal and performing a cross-connection function to map those traffic bearing channels to the appropriate format for the other of said protocols;

extracting non-traffic bearing channels from the first telecommunications signal and performing predetermined protocol conversion steps on those non-traffic bearing channels in order to regenerate those non-traffic bearing channels in the other of said protocols;

combining the channels as output from said extracting traffic bearing channels step and said extracting non-traffic bearing channels step to create a second telecommunications signal in the other of said protocols; and outputting the signal generated at said combining step.

18. A method as claimed in claim 17, wherein said extracting traffic bearing channels step comprises performing the cross-connection function at the 64 Kbit level.

19. A method as claimed in claim 17, wherein said first protocol has a concentrated format, and said second protocol has an unconcentrated format.

20. A method as claimed in claim 19, wherein the first protocol is V5.2, the second protocol is CAS, and the second element has a voice frequency (VF) interface, the method further comprising the steps of:

receiving the CAS signals output at said outputting step; and employing a channel bank application to convert said CAS signals in to VF signals for outputting from one or more VF interfaces to the second element.

21. A method as claimed in claim 17, wherein said extracting traffic bearing channels step further comprises the step of performing any conversion steps required to map the traffic bearing channels between the formats of the first and second protocols.

22. A method as claimed in claim 17, further comprising the steps of:

multiplexing traffic bearing channels output at said extracting traffic bearing channels step for transmission to the first element; and demultiplexing traffic bearing channels received in signals from the first element prior to those traffic bearing channels being processed at said extracting traffic bearing channels step.

23. A method as claimed in claim 17, further comprising the step of performing any compression and/or decompression functions required to convert the first telecommunications signal in to the second telecommunications signal.

24. A method as claimed in claim 17, further comprising the steps of providing a management interface to connect the telecommunications system with a management system, the management system being arranged to send data to the management interface for insertion in to the signals sent in the first protocol to the first element.

\* \* \* \* \*